United States Patent
Ihm et al.

(10) Patent No.: US 8,054,809 B2
(45) Date of Patent: Nov. 8, 2011

(54) RETRANSMISSION METHOD FOR MULTIPLE ANTENNA SYSTEM

(75) Inventors: Bin Chul Ihm, Gyeonggi-do (KR); Yong Suk Jin, Gyeonggi-do (KR); Jin Young Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 774 days.

(21) Appl. No.: 11/722,871

(22) PCT Filed: Dec. 27, 2005

(86) PCT No.: PCT/KR2005/004575
§ 371 (c)(1),
(2), (4) Date: Jul. 25, 2008

(87) PCT Pub. No.: WO2006/071048
PCT Pub. Date: Jul. 6, 2006

(65) Prior Publication Data
US 2009/0010227 A1  Jan. 8, 2009

(30) Foreign Application Priority Data
Dec. 27, 2004  (KR) ........................ 10-2004-0112992

(51) Int. Cl.
*H04W 4/00* (2009.01)
(52) U.S. Cl. ......... 370/334; 375/267; 455/101; 714/748
(58) Field of Classification Search .................. None
See application file for complete search history.

(56) References Cited

U.S. PATENT DOCUMENTS

| | | | |
|---|---|---|---|
| 6,735,620 B1 | 5/2004 | Blackmore et al. | |
| 2004/0057530 A1* | 3/2004 | Tarokh et al. | 375/267 |
| 2005/0031050 A1* | 2/2005 | Kim et al. | 375/267 |
| 2005/0255805 A1* | 11/2005 | Hottinen | 455/8 |

FOREIGN PATENT DOCUMENTS

| | | |
|---|---|---|
| JP | 2002-135226 | 5/2002 |
| JP | 2002318151 | 5/2002 |
| JP | 2003-023381 | 1/2003 |
| JP | 2003023381 | 1/2003 |

OTHER PUBLICATIONS

Hajian M. et al. "Split complex/quaternary space-time block coded multicarrier-CDMA in downlink Rayleigh fading channel", 2004 IEEE 59th Vehicular Technology Conference. May 2004.
Hajian, M. et al.: Split Complex/Quaternary Space-Time Block Coded Multicarrier-CDMA in Downlink Rayleigh Fading Channel; 59th Vehicular Technology Conference, vol. 2, May 17-19, 2004; pp. 1038-1043. Chapter B.

* cited by examiner

*Primary Examiner* — Chi Pham
*Assistant Examiner* — Mohammad Adhami
(74) *Attorney, Agent, or Firm* — Lee, Hong, Degerman, Kang & Waimey

(57) ABSTRACT

A packet retransmission method for use in a communication system transmitting a signal via at least two antennas is disclosed. The packet retransmission method includes the steps of: a) receiving a signal corresponding to a specific packet, and independently transmitting a signal via the at least two antennas corresponding to the received signal; b) receiving a NACK signal associated with the packet; and c) independently applying an STTD to a real part and an imaginary part of each signal transmitted at step (a), and transmitting the STTD-resultant signal. Therefore, the method separates a real part and an imaginary part from each other, obtains a STTD gain, and can efficiently transmit a packet.

5 Claims, 2 Drawing Sheets

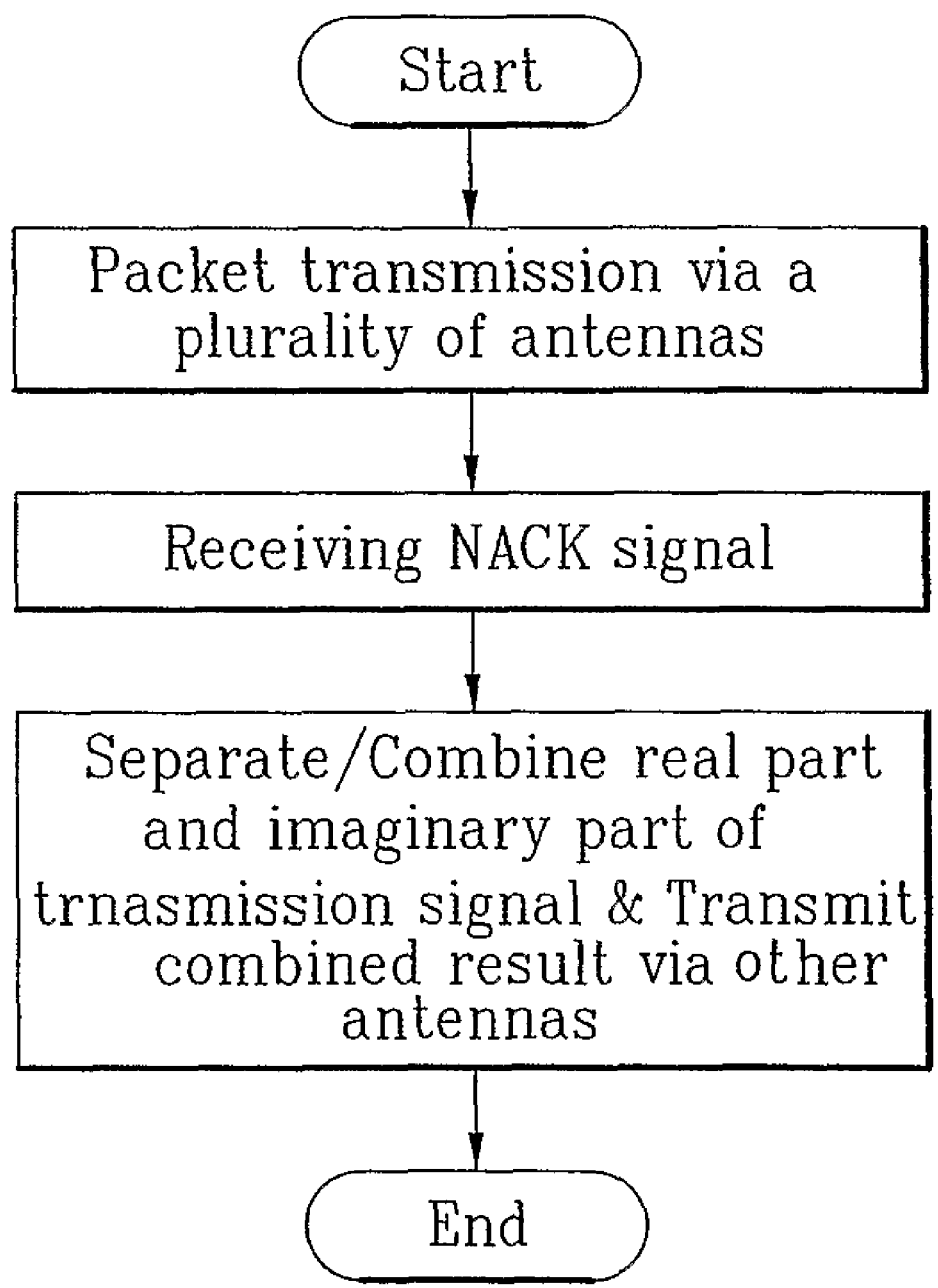

RETRANSMISSION METHOD FOR MULTIPLE ANTENNA SYSTEM

TECHNICAL FIELD

The present invention relates to a packet retransmission method for use in a communication system using a plurality of antennas, and more particularly to a method for constructing a new signal using a real part and an imaginary part of a transmission signal when a broadband wireless access system transmits packets via a plurality of antennas.

BACKGROUND ART

FIG. 1 is a block diagram illustrating a MIMO (Multiple Input Multiple Output) system. The MIMO system shown in FIG. 1 performs signal transmission/reception using a plurality of antennas, such that it can transmit desired data at high speed. Provided that the number of antennas of a base station is set to "M", the number of terminal antennas is set to "N", and the number "M" is higher than the number "N", capacity of a downlink MIMO channel is proportional to the number "N", the base station simultaneously transmits N data streams, resulting in the implementation of high-speed data transmission.

In the meantime, an automatic repeat request (ARQ) method controls a reception end to determine the presence or absence of erroneous transmission packets, transmits the determined result to a transmission end, and retransmits the erroneous packet when the presence of the erroneous transmission packets is determined. If the presence or absence of the erroneous packets is fed back to the reception end, the ARQ method transmits an acknowledgement (ACK) signal to the reception end when the absence of the erroneous packets is determined, and transmits a negative acknowledgement (NACK) signal to the reception end when the presence of the erroneous packets is determined.

A Hybrid Automatic Repeat Request (HARQ) method is implemented by applying a channel coding method to the ARQ method. In more detail, although an unexpected erroneous packet is detected from among received packets, the HARQ method does not discard the erroneous packet, it combines the erroneous packets with retransmitted packets, and decodes the combined result, such that it increases a diversity gain and a coding gain. In the meantime, the ARQ method transmits ACK/NACK signals using a high-layer signaling process, resulting in the occurrence of an increased delay. The HARQ transmits the ACK/NACK signals using a physical-layer signaling process, resulting in a reduced delay. When packets are transmitted via a plurality of antennas according to the above-mentioned HARQ method, the above-mentioned HARQ scheme has difficulty in determining how to apply the space-time coding method to retransmission packets.

DISCLOSURE OF INVENTION

An object of the present invention can be achieved by transmitting a first signal corresponding to a packet via the at least two antennas independently, receiving a negative acknowledgement (NACK) signal corresponding to the packet and transmitting a second signal corresponding to the packet, applying independently Space Time Transmit Diversity (STTD) to a real part and an imaginary part of the second signal.

In another aspect of the present invention, provided herein is a packet retransmission method in a system transmitting a signal via three antennas, the method comprises the step of transmitting a first, a second, and a third signal corresponding to a packet via a first, a second, and a third antenna, respectively, receiving step of a negative acknowledgement (NACK) signal associated with the packet, and a step of transmitting a retransmission signal, which is generated using a real part of the first signal and an imaginary part of the second signal, via the third antenna.

Preferably, the signal generated using the real part of the second signal and the imaginary part of the third signal may be transmitted via the first antenna. Further, the signal generated using the real part of the third signal and the imaginary part of the first signal may be transmitted via the second antenna.

In other aspect of the present invention, provided herein is a packet retransmission method in a system transmitting a signal via three antennas, the method comprises the step of transmitting a first, a second, a third, and a fourth signal corresponding to a packet via a first, a second, a third, and a fourth antenna, respectively, the step of receiving a negative acknowledgement (NACK) signal associated with the packet and the step of transmitting a retransmission signal, which is generated using a real part of the first signal and an imaginary part of the second signal, via the third antenna or the fourth antenna.

BRIEF DESCRIPTION OF DRAWINGS

FIG. 2 is a flow chart illustrating a packet retransmission method according to the present invention.

BEST MODE FOR CARRYING OUT THE INVENTION

Figure 1:
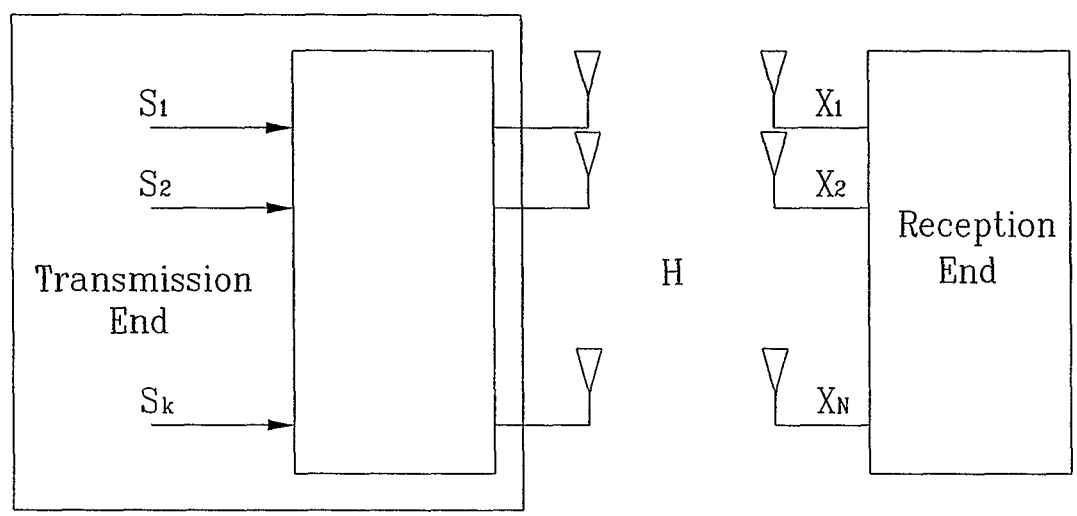
FIG. 1 is a block diagram illustrating a MIMO (Multiple Input Multiple Output) system.

Reference will now be made in detail to the preferred embodiments of the present invention, examples of which are illustrated in the accompanying drawings.

An initial transmission packet of a communication system capable of transmitting a signal via three transmission antennas is transmitted via each antenna as denoted by the following Equation 1:

$$\begin{bmatrix} s_1 \\ s_2 \\ s_3 \end{bmatrix}$$ [Equation 1]

With reference to Equation 1, $S_i$ is indicative of a signal transmitted via an i-th antenna.

In this case, a reception end receives a signal via at least three reception antennas, and the received signal can be represented by the following Equation 2:

$$x = Hs + v$$ [Equation 2]

With reference to Equation 2, x is indicative of a reception signal, H is indicative of a channel matrix, s is indicative of a transmission signal vector, and v is indicative of noise.

The above Equation 2 can also be represented by the following Equation 3:

$$\begin{bmatrix} x_1(t) \\ x_2(t) \\ x_3(t) \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} s_1 \\ s_2 \\ s_3 \end{bmatrix} + \begin{bmatrix} v_1 \\ v_2 \\ v_3 \end{bmatrix}$$

$$\begin{bmatrix} v_1 \\ v_2 \\ v_3 \end{bmatrix} = [\,h_1 \quad h_2 \quad h_3\,] \begin{bmatrix} s_1 \\ s_2 \\ s_3 \end{bmatrix} + \begin{bmatrix} v_1 \\ v_2 \\ v_3 \end{bmatrix}$$

[Equation 3]

In the meantime, if a NACK signal associated with the initial transmission packet is received, the initial transmission packet is re-transmitted. In a communication system transmitting signals via three antennas, a method for transmitting may be represented as the following Equation 4:

$$\begin{bmatrix} -s_2^* \\ s_1^* \\ s_3^* \end{bmatrix}$$

[Equation 4]

With reference to Equation 4, when a packet is re-transmitted, a first antenna uses a conjugate of a complex signal transmitted from a second antenna during an initial transmission time, multiplies the conjugate result by a negative (−) sign, and transmits the multiplied result.

In the meantime, the second antenna transmits the conjugate of the signal initially transmitted via the first antenna. And, third antenna retransmits the signal initially transmitted via the third antenna.

In this way, when the packet is retransmitted, an antenna having been used at the initial transmission is changed among three antennas, the conjugate or the negative (−) conjugate is applied to the transmission of the retransmitted packet, such that the reception end can obtain a Space Time Transmit Diversity (STTD) gain.

An initial transmission packet of a communication system capable of transmitting a signal via four transmission antennas is transmitted via each antenna as denoted by the following Equation 1:

$$\begin{bmatrix} s_1 \\ s_2 \\ s_3 \\ s_4 \end{bmatrix}$$

[Equation 5]

With reference to Equation 1, $S_i$ is indicative of a signal transmitted via an i-th antenna.

In the meantime, if a NACK signal associated with the initial transmission packet is transmitted, the initial transmission packet is retransmitted. A method for transmitting a signal associated with a retransmission packet via four antennas is represented by the following Equation 6:

$$\begin{bmatrix} -s_2^* \\ s_1^* \\ -s_4^* \\ s_3^* \end{bmatrix}$$

[Equation 6]

With reference to Equation 6, when a packet is re-transmitted, a first antenna uses a conjugate of a complex signal transmitted from a second antenna during an initial transmission time, multiplies the conjugate result by a negative (−) sign, and transmits the multiplied result.

In the meantime, the second antenna uses a conjugate of a complex signal initially transmitted from the first antenna, and transmits the conjugate signal. A third antenna uses a conjugate of a complex signal initially transmitted from a fourth antenna during, multiplies the conjugate result by a negative (−) sign, and transmits the multiplied result. The second antenna uses a conjugate of a complex signal initially transmitted from the first antenna, and transmits the conjugate result.

In this way, when the packet is retransmitted, an antenna having been used at the initial transmission time is changed among four antennas, the conjugate or the conjugate and negative multiplication is applied to the retransmission of the packet, and the above-mentioned conjugate calculation result is transmitted to a reception end, such that the reception end can obtain a Space Time Transmit Diversity (STTD) gain using the conjugation calculation result.

If the system equipped with three antennas receives an initial transmission packet and a retransmission packet, the received signal can be represented by the following Equation 7:

$$x = As + v$$

[Equation 7]

With reference to Equation 7, x is indicative of an initial reception signal vector or a retransmission reception signal, A is indicative of a channel matrix when a signal is initially transmitted or re-transmitted, s is indicative of a transmission signal, and v is indicative of a noise vector.

The above Equation 7 can also be represented by the following Equation 8:

$$\begin{bmatrix} x_1(t) \\ x_2(t) \\ x_3(t) \\ x_1^*(t+1) \\ x_2^*(t+1) \\ x_3^*(t+1) \end{bmatrix} = \begin{bmatrix} h_{11} & h_{12} & h_{13} \\ h_{21} & h_{22} & h_{23} \\ h_{31} & h_{32} & h_{33} \\ h_{12}^* & -h_{11}^* & h_{13}^* \\ h_{22}^* & -h_{21}^* & h_{23}^* \\ h_{32}^* & -h_{31}^* & h_{33}^* \end{bmatrix} \begin{bmatrix} s_1 \\ s_2 \\ s_3 \end{bmatrix} + \begin{bmatrix} v_1 \\ v_2 \\ v_3 \\ v_4 \\ v_5 \\ v_6 \end{bmatrix}$$

[Equation 8]

In this case, in order to restore a transmission signal vector s using the reception signal vector x, a variety of detection techniques (i.e., a maximum likelihood method, a MMSE (Minimum Mean Square Error) method, and a zero-forcing (ZF) method, etc.) can be used. The above-mentioned detection techniques can also be applied to the system equipped with four antennas in the same manner as in the above-mentioned system equipped with three antennas.

As described above, only the first and second antennas among three antennas have the STTD structure, and the third antenna retransmits a received signal without any change, a diversity gain cannot be acquired from a signal $S_3$. In the meantime, all signals can acquire a Space Diversity in the system equipped with four antennas, but a real part and an imaginary part of each signal use the same antenna, such that the space diversity cannot be sufficiently acquired.

FIG. 2 is a flow chart illustrating a packet retransmission method according to the present invention.

Referring to FIG. 2, in order to allow all signals $S_1$, $S_2$, and $S_3$ of the system equipped with three antennas to obtain space diversity, a real part and an imaginary part of each retransmission packet signal are separated, and the STTD is applied to the real part and the imaginary part, respectively.

As denoted by Equation 8, a real part and an imaginary part of a retransmission packet signal for use in the system equipped with three antennas are separated.

In the meantime, a real part and an imaginary part for use in the system equipped with four antennas can be separated from each other as denoted by the following Equation 9:

$$\begin{bmatrix} \pm\text{Re}(s_3) \pm i\text{Im}(s_2) \\ \pm\text{Re}(s_1) \pm i\text{Im}(s_3) \\ \pm\text{Re}(s_2) \pm i\text{Im}(s_1) \end{bmatrix} \quad \text{[Equation 9]}$$

$$\begin{bmatrix} \pm\text{Re}(s_2) \pm i\text{Im}(s_3) \\ \pm\text{Re}(s_1) \pm i\text{Im}(s_4) \\ \pm\text{Re}(s_4) \pm i\text{Im}(s_1) \\ \pm\text{Re}(s_3) \pm i\text{Im}(s_2) \end{bmatrix} \quad \text{[Equation 10]}$$

With reference to Equations 9 and 10, the sign of $\text{Re}(s_i)$ or $\text{Im}(s_j)$ is determined to be a positive (+) sign or a negative (−) sign.

A reception signal association with an initial transmission packet for use in a system capable of transmitting a signal via three antennas can be represented by the following Equation 11:

$$x_1 = H_1 s + v_1 \quad \text{[Equation 11]}$$

The above-mentioned Equation 11 can also be represented by the following Equation 12:

$$\begin{bmatrix} \text{Re}(x_1) \\ \text{Im}(x_1) \end{bmatrix} = \begin{bmatrix} \text{Re}(H_1) & -\text{Im}(H_1) \\ \text{Im}(H_1) & \text{Re}(H_1) \end{bmatrix} \begin{bmatrix} \text{Re}(s) \\ \text{Im}(s) \end{bmatrix} + \begin{bmatrix} \text{Re}(v_1) \\ \text{Im}(v_1) \end{bmatrix} \quad \text{[Equation 12]}$$

where $$\text{Re}(s) = \begin{bmatrix} \text{Re}(s_1) \\ \text{Re}(s_2) \\ \text{Re}(s_3) \end{bmatrix}, \quad \text{Im}(s) = \begin{bmatrix} \text{Im}(s_1) \\ \text{Im}(s_2) \\ \text{Im}(s_3) \end{bmatrix}$$

The reception signal association with the retransmission packet can be represented by the following Equation 13:

$$x_2 = H_2 \begin{bmatrix} \pm\text{Re}(s_3) \pm i\text{Im}(s_2) \\ \pm\text{Re}(s_1) \pm i\text{Im}(s_3) \\ \pm\text{Re}(s_2) \pm i\text{Im}(s_1) \end{bmatrix} + v_2 \quad \text{[Equation 13]}$$

$$x_2 = H_3 \text{Re}(s) + H_4 i \text{Im}(s) + v_2$$

$$\begin{bmatrix} \text{Re}(x_2) \\ \text{Im}(x_2) \end{bmatrix} = \begin{bmatrix} \text{Re}(H_3) & -\text{Im}(H_4) \\ \text{Im}(H_3) & \text{Re}(H_4) \end{bmatrix} \begin{bmatrix} \text{Re}(s) \\ \text{Im}(s) \end{bmatrix} + \begin{bmatrix} \text{Re}(v_2) \\ \text{Im}(v_2) \end{bmatrix}$$

With reference to Equation 13, $H_3$ is equal to $H_2 P_3$, $H_4$ is equal to $H_2 P_4$, and $P_3$ and $P_4$ are denoted by the following Equation 14:

$$P_3 = \begin{bmatrix} 0 & 0 & \pm 1 \\ \pm 1 & 0 & 0 \\ 0 & \pm 1 & 0 \end{bmatrix}, \quad P_4 = \begin{bmatrix} 0 & \pm 1 & 0 \\ 0 & 0 & \pm 1 \\ \pm 1 & 0 & 0 \end{bmatrix} \quad \text{[Equation 14]}$$

The value $$\begin{bmatrix} \text{Re}(s) \\ \text{Im}(s) \end{bmatrix}$$

can be calculated by Equations 13 and 14.

In the meantime, $P_3$ and $P_4$ may select one of many matrixes shown in the following Equation 15 as necessary.

$$\begin{bmatrix} 0 & 0 & \pm 1 \\ \pm 1 & 0 & 0 \\ 0 & \pm 1 & 0 \end{bmatrix}, \begin{bmatrix} 0 & \pm 1 & 0 \\ 0 & 0 & \pm 1 \\ \pm 1 & 0 & 0 \end{bmatrix}, \quad \text{[Equation 15]}$$

$$\begin{bmatrix} \pm 1 & 0 & 0 \\ 0 & 0 & \pm 1 \\ 0 & \pm 1 & 0 \end{bmatrix}, \begin{bmatrix} 0 & 0 & \pm 1 \\ 0 & \pm 1 & 0 \\ \pm 1 & 0 & 0 \end{bmatrix}, \begin{bmatrix} 0 & \pm 1 & 0 \\ \pm 1 & 0 & 0 \\ 0 & 0 & \pm 1 \end{bmatrix},$$

Although the system includes at least four reception antennas, it can detect a transmission signal using the following Equation 16:

$$x_2 = H_2 \begin{bmatrix} \pm\text{Re}(s_2) \pm i\text{Im}(s_3) \\ \pm\text{Re}(s_1) \pm i\text{Im}(s_4) \\ \pm\text{Re}(s_4) \pm i\text{Im}(s_1) \\ \pm\text{Re}(s_3) \pm i\text{Im}(s_2) \end{bmatrix} + v_2 \quad \text{[Equation 16]}$$

$$x_2 = H_3 \text{Re}(s) + H_4 i \text{Im}(s) + v_2$$

$$\begin{bmatrix} \text{Re}(x_2) \\ \text{Im}(x_2) \end{bmatrix} = \begin{bmatrix} \text{Re}(H_3) & -\text{Im}(H_4) \\ \text{Im}(H_3) & \text{Re}(H_4) \end{bmatrix} \begin{bmatrix} \text{Re}(s) \\ \text{Im}(s) \end{bmatrix} + \begin{bmatrix} \text{Re}(v_2) \\ \text{Im}(v_2) \end{bmatrix}$$

With reference to Equation 16, $H_3$ is equal to $H_2 P_3$, $H_4$ is equal to $H_2 P_4$, and $P_3$ and $P_4$ are denoted by the following Equation 17:

$$P_3 = \begin{bmatrix} 0 & \pm 1 & 0 & 0 \\ \pm 1 & 0 & 0 & 0 \\ 0 & 0 & 0 & \pm 1 \\ 0 & 0 & \pm 1 & 0 \end{bmatrix}, \quad \text{[Equation 17]}$$

$$P_4 = \begin{bmatrix} 0 & 0 & \pm 1 & 0 \\ 0 & 0 & 0 & \pm 1 \\ \pm 1 & 0 & 0 & 0 \\ 0 & \pm 1 & 0 & 0 \end{bmatrix}$$

In the meantime, $P_3$ and $P_4$ may select one of many matrixes shown in the following Equation 18 as necessary.

$$\begin{bmatrix} 0 & \pm 1 & 0 & 0 \\ \pm 1 & 0 & 0 & 0 \\ 0 & 0 & 0 & \pm 1 \\ 0 & 0 & \pm 1 & 0 \end{bmatrix}, \begin{bmatrix} 0 & 0 & \pm 1 & 0 \\ 0 & 0 & 0 & \pm 1 \\ \pm 1 & 0 & 0 & 0 \\ 0 & \pm 1 & 0 & 0 \end{bmatrix}, \quad \text{[Equation 18]}$$

$$\begin{bmatrix} 0 & 0 & 0 & \pm 1 \\ 0 & 0 & \pm 1 & 0 \\ 0 & \pm 1 & 0 & 0 \\ \pm 1 & 0 & 0 & 0 \end{bmatrix}, \begin{bmatrix} 0 & \pm 1 & 0 & 0 \\ \pm 1 & 0 & 0 & 0 \\ 0 & 0 & \pm 1 & 0 \\ 0 & 0 & 0 & \pm 1 \end{bmatrix},$$

-continued $$\begin{bmatrix} 0 & 0 & \pm 1 & 0 \\ 0 & 0 & 0 & \pm 1 \\ 0 & \pm 1 & 0 & 0 \\ \pm 1 & 0 & 0 & 0 \end{bmatrix}, \begin{bmatrix} 0 & 0 & 0 & \pm 1 \\ 0 & 0 & \pm 1 & 0 \\ \pm 1 & 0 & 0 & 0 \\ 0 & \pm 1 & 0 & 0 \end{bmatrix},$$

$$\begin{bmatrix} \pm 1 & 0 & 0 & 0 \\ 0 & \pm 1 & 0 & 0 \\ 0 & 0 & 0 & \pm 1 \\ 0 & 0 & \pm 1 & 0 \end{bmatrix}, \begin{bmatrix} 0 & 0 & 0 & \pm 1 \\ 0 & 0 & \pm 1 & 0 \\ \pm 1 & 0 & 0 & 0 \\ 0 & \pm 1 & 0 & 0 \end{bmatrix},$$

$$\begin{bmatrix} 0 & 0 & \pm 1 & 0 \\ 0 & 0 & 0 & \pm 1 \\ 0 & \pm 1 & 0 & 0 \\ \pm 1 & 0 & 0 & 0 \end{bmatrix},$$

According to the present invention, the above-mentioned method is superior to a Forward Error Correction (FEC)-based retransmission technique in light of a transmission power aspect for acquiring the same error probability.

The above-mentioned method according to the present invention has a high performance superior to that of a conventional STTD structure. The conventional STTD structure is more efficiently operated in a low-speed environment than in a high-speed environment, but the above-mentioned method according to the present invention can be very sufficiently applied to both the high-speed environment and the low-speed environment.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may apply to a mobile communication system.

What is claimed is:

1. A packet retransmission method for use in a system capable of transmitting a signal via first to n-th antennas wherein n is at least three, the method comprising:
    transmitting first to n-th signals corresponding to a packet via the first to n-th antennas, respectively;
    receiving a negative acknowledgement (NACK) signal associated with the packet;
    generating an i-th retransmission signal by using a real part of one of the first to n-th signals other than an i-th signal transmitted via an i-th antenna and an imaginary part of another one of the first to n-th signals other than the i-th signal, wherein i=1, 2, . . . n; wherein the real part and the imaginary part are from different signals; and
    transmitting the i-th retransmission signal via the i-th antenna.

2. The method of claim 1, wherein n is three and generating the i-th retransmission signal includes:
    generating a first retransmission signal using a real part of a third signal and an imaginary part of a second signal;
    generating a second retransmission signal using a real part of a first signal and an imaginary part of the third signal; and
    generating a third retransmission signal using a real part of the second signal and an imaginary part of the first signal.

3. The method of claim 2, wherein transmitting the i-th retransmission signal includes:
    transmitting the first retransmission signal via a first antenna;
    transmitting the second retransmission signal via a second antenna; and
    transmitting the third retransmission signal via a third antenna.

4. The method of claim 1, wherein n is four and generating the i-th retransmission signal includes:
    generating a first retransmission signal using a real part of a second signal and an imaginary part of a third signal;
    generating a second retransmission signal using a real part of a first signal and an imaginary part of a fourth signal;
    generating a third retransmission signal using a real part of the fourth signal and an imaginary part of the first signal; and
    generating a fourth retransmission signal using a real part of the third signal and an imaginary part of the second signal.

5. The method of claim 4, wherein transmitting the i-th retransmission signal includes:
    transmitting the first retransmission signal via a first antenna;
    transmitting the second retransmission signal via a second antenna;
    transmitting the third retransmission signal via a third antenna; and
    transmitting the fourth retransmission signal via a fourth antenna.

* * * * *